(12) United States Patent
Tao et al.

(10) Patent No.: US 11,521,629 B1
(45) Date of Patent: Dec. 6, 2022

(54) METHOD FOR OBTAINING DIGITAL AUDIO TAMPERING EVIDENCE BASED ON PHASE DEVIATION DETECTION

(71) Applicant: INSTITUTE OF AUTOMATION, CHINESE ACADEMY OF SCIENCES, Beijing (CN)

(72) Inventors: Jianhua Tao, Beijing (CN); Shan Liang, Beijing (CN); Shuai Nie, Beijing (CN); Jiangyan Yi, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/668,104

(22) Filed: Feb. 9, 2022

(30) Foreign Application Priority Data

Jun. 29, 2021 (CN) .......................... 202110727936.4

(51) Int. Cl.
*G10L 19/02* (2013.01)
*G06F 17/18* (2006.01)
(Continued)

(52) U.S. Cl.
CPC .............. *G10L 19/02* (2013.01); *G06F 17/14* (2013.01); *G06F 17/18* (2013.01); *G10L 25/21* (2013.01)

(58) Field of Classification Search
None
See application file for complete search history.

(56) References Cited

U.S. PATENT DOCUMENTS 5,893,057 A * 4/1999 Fujimoto ................ G10L 17/00
704/275
11,032,415 B1 * 6/2021 Retnamma ............ H04L 9/3247
(Continued)

FOREIGN PATENT DOCUMENTS

CN 101271690 A 9/2008
CN 106941008 A 7/2017
(Continued)

OTHER PUBLICATIONS

Lin, Xiaodan, and Xiangui Kang. "Exposing speech tampering via spectral phase analysis." Digital Signal Processing 60 (2017): 63-74. (Year: 2021).*
(Continued)

*Primary Examiner* — Shaun Roberts
(74) *Attorney, Agent, or Firm* — Westbridge IP LLC

(57) ABSTRACT

Disclosed is a digital audio tampering forensics method based on phase offset detection, comprising: multiplying a signal to be identified with a time label to obtain a modulation signal of the signal to be identified; then, performing a short-time Fourier transform on the signal to be identified and the modulation signal to obtain a signal power spectrum and a modulation signal power spectrum; computing group delay characteristics by using the signal power spectrum and the modulation signal power spectrum; computing a mean value of the group delay characteristics, and then using the mean value results for smoothing computation to obtain phase information of a current frame signal; computing a dynamic threshold by using the phase information of the current frame signal, and then deciding whether the signal is tampered by using the dynamic threshold and the phase information of the current frame signal.

7 Claims, 2 Drawing Sheets

(51) Int. Cl.
*G06F 17/14* (2006.01)
*G10L 25/21* (2013.01)

(56) References Cited

U.S. PATENT DOCUMENTS

| | | | | |
|---|---|---|---|---|
| 11,217,076 | B1* | 1/2022 | Siminoff | H04N 7/181 |
| 2006/0257001 | A1* | 11/2006 | Van Der Veen | H04N 21/235 |
| 2008/0172230 | A1* | 7/2008 | Hayakawa | G10L 17/14 |
| | | | | 704/E17.001 |
| 2013/0077805 | A1* | 3/2013 | Kirsch | H04N 21/8106 |
| | | | | 381/119 |
| 2013/0179158 | A1* | 7/2013 | Nakamura | G10L 21/00 |
| | | | | 704/205 |
| 2014/0278447 | A1* | 9/2014 | Unoki | G10L 19/018 |
| | | | | 704/500 |
| 2017/0200457 | A1* | 7/2017 | Chai | G10L 25/18 |
| 2021/0193174 | A1* | 6/2021 | Enzinger | G10L 17/06 |

FOREIGN PATENT DOCUMENTS

| | | |
|---|---|---|
| CN | 107274915 A | 10/2017 |
| CN | 108831506 A | 11/2018 |
| CN | 109389992 A | 2/2019 |
| CN | 112151067 A | 12/2020 |

OTHER PUBLICATIONS

Esquef et al., Edit Detection in Speech Recordings via Instantaneous Electric Network Frequency Variations, IEEE Transactions on Information Forensics and Security, pp. 2314-2326, vol. 9, No. 12, dated Dec. 31, 2014.

Hua et al., On Practical Issues of Electric Network Frequency Based Audio Forensics, IEEE Access, vol. 5, DOI: 10.1109/ACCESS.2017.2647921, Electronic ISSN: 2169-3536, dated Jan. 5, 2017.

Huang, Digital Audio Forgery Detection Methods Based on Correlativity and Spectrum Analysis, Master Dissertation for Dalian University of Technology, dated Dec. 31, 2013.

Shi, Study on the Techniques of Digital Audio Forgery Detection, Master Dissertation for Dalian University of Technology, dated Dec. 31, 2013.

* cited by examiner

METHOD FOR OBTAINING DIGITAL AUDIO TAMPERING EVIDENCE BASED ON PHASE DEVIATION DETECTION

CROSS-REFERENCE TO RELATED APPLICATIONS

The present disclosure claims priority to Chinese Patent Application 202110727936.4 entitled "Digital audio tampering forensics method based on phase offset detection" filed on Jun. 9, 2021, the entire content of which is incorporated herein by reference.

TECHNICAL FIELD

The present disclosure relates to the field of audio identification, and more particularly to a digital audio tampering forensics method based on phase offset detection.

BACKGROUND OF THE INVENTION

The main principle of audio tampering is that audio files will record the inherent characteristics (such as the background noise of microphone) of recording device or the inherent information of software such as audio processing (compression, denoising) during recording. For the original file that has not been tampered with, this information will not change over time, and statistics information is stable. At present, the commonly used solutions include tampering forensics based on the energy distribution difference of background noise and tampering forensics based on the recognition of the recording environment with ambient reverberation, etc. These methods only work for files in a certain compressed format and cannot be generalized to all audio formats.

Since audio tampering requires a second compression, which will lead to an offset of sampling points (frame offset), that is, the quantization characteristics will change. Therefore, a relatively common solution is to use Modified Discrete Cosine Transform (MDCT) coefficients as features to detect frame offsets in order to achieve the purpose of tampering identification and positioning.

Chinese Patent No. CN107274915B provides an automatic detection method of digital audio tampering based on feature concatenating, which includes: firstly, downsampling the signal to be detected; then, obtaining the Electric Network Frequency (ENF) component in the signal by performing band-pass filtering centered on the standard frequency of ENF; then, extracting the phase feature of ENF components based on DFT0, the phase feature based on DFT1 and instantaneous frequency feature based on Hilbert transform respectively; obtaining feature set after feature concatenating; finally, using the optimized support vector machine classifier to train some data in the feature set to obtain training model; using the training model could predict the voice signal to be detected. The present disclosure uses the representative phase and instantaneous frequency features in ENF signal for feature concatenating, and uses support vector machine for classification to obtain the classification model. This model can detect the signal insertion and deletion effectively, being more intuitive and simple compared with the traditional discriminant method.

Chinese patent application with Publication No. CN109389992A discloses a voice emotion recognition method based on amplitude and phase information, which includes the following steps: step 1, inputting data preparation: selecting an emotion recognition database and processing the data in segments; step 2: extracting amplitude and phase information; step 3, constructing a convolutional neural network to extract deep features from a concatenating information of amplitude and phase; step 4: constructing a long and short-term memory network to complete emotion classification; finally, outputting the emotion classification results. Compared with the prior art, the voice emotion recognition method of the present invention takes into account the phase information of voice, effectively utilizes the complementarity of phase and amplitude information, selects CNN to automatically extract deep emotion-related features from amplitude and phase information at the same time, thereby greatly improving the richness of features and obtaining better voice emotion recognition effect.

At present, the prior art has the following problems:

MDCT features can directly correspond to the energy distribution information of the signal, for example, if the energy distribution is abnormal above 16 KHz and the phase information cannot be directly reflected.

Common MDCT features are very sensitive to audio compression encoding methods, lack of unified framework to process audio signals of all compression encoding methods.

SUMMARY OF THE INVENTION

In view of the above, the present invention provides a digital audio tampering forensics method based on phase offset detection and more particularly, the present invention is implemented through the following technical solutions:

S1: multiplying a signal to be identified with a time label to obtain the modulation signal of the signal to be identified;

then, performing a short-time Fourier transform on the signal to be identified and the modulation signal to obtain a signal power spectrum and a modulation signal power spectrum;

S2: computing group delay characteristics by using the signal power spectrum and the modulation signal power spectrum;

S3: computing a mean value of the group delay characteristics, and then using the mean value results for smoothing computation to obtain a phase information of a current frame signal;

S4: computing a dynamic threshold by using the phase information of the current frame signal, and then deciding whether the signal is tampered by using the dynamic threshold and the phase information of the current frame signal.

Preferably, the particular method for performing the short-time Fourier transform on the signal to be identified and the modulation signal is:

$$Y(l, k) = \sum y(n)w(n)\exp\left(-j\frac{2\pi nk}{N}\right)$$

$$X(l, k) = \sum ny(n)w(n)\exp\left(-j\frac{2\pi nk}{N}\right)$$

where, y(n) is the signal to be identified, n is a time label, N is a frame length with a value of 512, w(n) is a Hamming window, l is a serial number of time frames, and k is a serial number of frequency bands.

Preferably, the method of computing group delay characteristics by using the signal power spectrum and modulation signal power spectrum is as follows:

$$\tau(1, k) = \frac{\mathrm{Re}(Y(1, k))\mathrm{Re}(X(1, k)) + \mathrm{Im}(Y(1, k))\mathrm{Im}(X(1, k))}{|Y(1, k)|^2}$$

where, Re(•) and Im(•) represent the real and imaginary parts of an extracted complex number respectively.

Preferably, the method of computing mean value of the group delay characteristics, and then using the mean value results for smoothing computation is as follows:

$$\Lambda(l) = \frac{1}{K}\sum_{k=1}^{K}\tau(1, k)$$

$$\chi(l) = \alpha\chi(l-1) + (1-\alpha)\Lambda(l)$$

where:
τ(l,k): group delay characteristics;
Λ(l): mean value of the group delay characteristics
K: number of the frequency bands;
χ(l): phase information of the current frame signal;
χ(l−1): phase information of the previous frame signal;
α: interframe smoothing factor.

Preferably, the number of the frequency bands K is 256.

Preferably, the value range of the interframe smoothing factor α is 0.9-0.98.

Preferably, the method of computing dynamic threshold by using the phase information of the current frame signal is as follows:

$$\varepsilon(l) = \frac{1}{L}\sum_{m=1}^{L}\chi(l-m)$$

where:
ε(l): dynamic threshold;
L: window length used in computing the dynamic threshold;
χ(l−m): phase information of the previous m frame signals;

Preferably, the value range of the window length L used in computing the dynamic threshold is 20-30.

Preferably, the method of deciding whether the signal is tampered as follows:

$$H(l) = \begin{cases} 1, & \text{if } |\varepsilon(l) - \chi(l)| > \gamma|\varepsilon(l)| \\ 0, & \text{otherwise} \end{cases}$$

where,
H(l): the identification result of each frame;
γ: the set threshold;
|ε(l)−χ(l)|: phase difference of the frame signal;
|ε(l)|: modulus of the dynamic threshold;

For the identification result of each frame, H(l), if the phase difference of the current frame signal exceeds the modulus of the dynamic threshold by γ times, it means that there is a significant difference in the current frame signal and the identification result is 1, which indicates that the signal in this frame is tampered data; otherwise, the identification result is 0, which indicates that the signal in this frame is normal voice information.

Preferably, the value range of the set threshold γ is 1.5-2.

Compared with the prior art, the technical solutions provided by the embodiments of the present disclosure has the following advantages:

(1) The characteristics used have nothing to do with the signal compression encoding method, so they have higher robustness, which is suitable for audio signals of various encoding methods.

(2) The extracted group delay information can directly characterize the phase information of the signal, with a higher accuracy of tampering identification.

DETAILED DESCRIPTION OF THE INVENTION

Exemplary embodiments will be described in detail here, and examples thereof are shown in the accompanying drawings. When the following description refers to the drawings, unless otherwise indicated, the same numbers in different drawings indicate the same or similar elements. Implementations described in the following exemplary embodiments do not represent all implementations consistent with the present invention; on the contrary, they are merely examples of apparatus and methods consistent with some aspects of the present invention as detailed in the appended claims.

Figure 1:
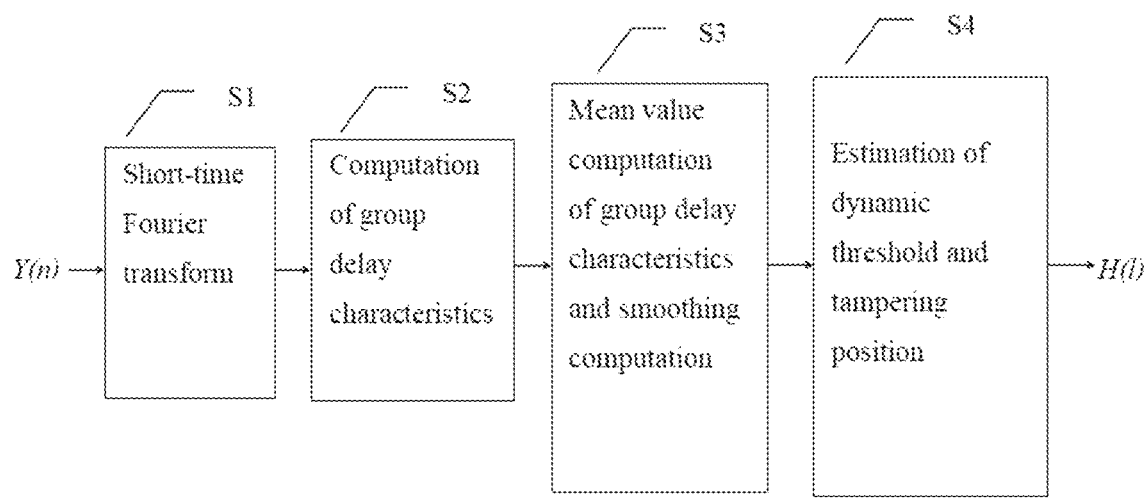
FIG. 1 is a flow chart of the digital audio tampering forensics method based on phase offset detection according to an embodiment of the present disclosure.
Figure 2:
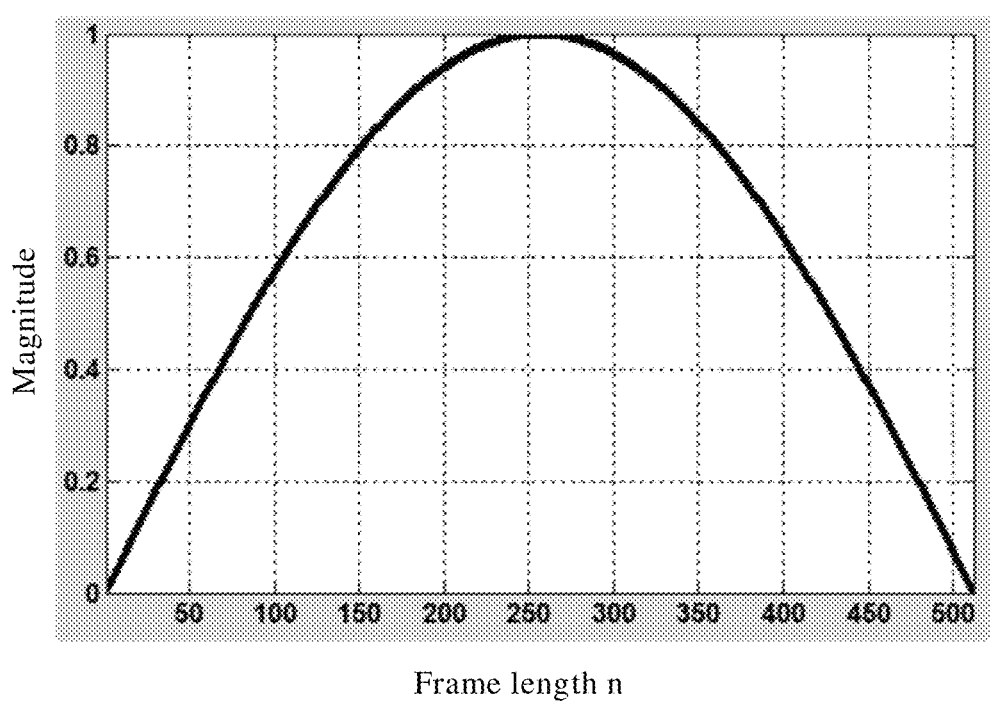
FIG. 2 is an example diagram of a Hamming window according to an embodiment of the present invention.

As shown in FIG. 1, the digital audio tampering forensics method based on phase offset detection provided by the embodiment of the present disclosure includes:

S1: Multiplying a signal to be identified with a time label to obtain a modulation signal of the signal to be identified; then, performing a short-time Fourier transform on the signal to be identified and the modulation signal to obtain the signal power spectrum and the modulation signal power spectrum, the particular method is as follows:

$$Y(1, k) = \sum y(n)w(n)\exp\left(-j\frac{2\pi nk}{N}\right)$$

$$X(1, k) = \sum ny(n)w(n)\exp\left(-j\frac{2\pi nk}{N}\right)$$

where, y(n) is the signal to be identified, n is a time label, N is the frame length with a value of 512, w(n) is a Hamming window with a length of 512; l is a serial number of the time frame, and k is a serial number of the frequency band. The example diagram of the Hamming window is shown in FIG. 2.

S2: Computing group delay characteristics by using the signal power spectrum and the modulation signal power spectrum, the particular method is as follows:

$$\tau(1, k) = \frac{\mathrm{Re}(Y(1, k))\mathrm{Re}(X(1, k)) + \mathrm{Im}(Y(1, k))\mathrm{Im}(X(1, k))}{|Y(1, k)|^2}$$

where, Re(•) and Im(•) represent the real and imaginary parts of an extracted complex number respectively.

S3: Computing the mean value of the group delay characteristics, and then using the mean value results for smoothing computation to obtain the phase information of the current frame signal; the particular method is as follows:

$$\Lambda(l) = \frac{1}{K}\sum_{k=1}^{K}\tau(1, k)$$

$$\chi(l) = \alpha\chi(l-1) + (1-\alpha)\Lambda(l)$$

where:

τ(l,k): group delay characteristics;

Λ(l): mean value of the group delay characteristics

K: number of the frequency bands, the value of which is 256;

χ(l): phase information of the current frame signal;

χ(l−1): phase information of the previous frame signal;

α: interframe smoothing factor, the value of which is 0.98.

S4: Computing the dynamic threshold by using the phase information of the current frame signal, the particular method is as follows:

$$\varepsilon(l) = \frac{1}{L}\sum_{m=1}^{L}\chi(l-m)$$

where,

ε(l): dynamic threshold;

L: window length, the value of which is 20;

χ(l−m): phase information of the previous m frame signals;

the particular method of deciding whether the signal is tampered by using the dynamic threshold and the phase information of the current frame signal.

$$H(l) = \begin{cases} 1, & \text{if } |\varepsilon(l) - \chi(l)| > \gamma|\varepsilon(l)| \\ 0, & \text{otherwise} \end{cases}$$

where,

H(l): the identification result of each frame;

γ: the set threshold, the value of which is 2;

If the phase difference of the current frame signal exceeds the modulus of the dynamic threshold by γ times, it means that there is a significant difference in the current frame signal and the identification result is 1, which indicates that the signal in this frame is tampered data; otherwise, the identification result is 0, which indicates that the signal in this frame is normal voice information.

Embodiment

As shown in FIG. 1, the digital audio tampering forensics method based on phase offset detection provided by the embodiment of the present disclosure includes:

S1: Taking the 2019 ASV spoof audio identification competition data set as an example, multiplying any audio signal with the time label to obtain a modulation signal of the signal to be identified;

then, performing a short-time Fourier transform on the signal to be identified and the modulation signal to obtain a signal power spectrum and a modulation signal power spectrum, the particular method is as follows:

$$Y(1, k) = \sum y(n)w(n)\exp\left(-j\frac{2\pi nk}{N}\right)$$

$$X(1, k) = \sum ny(n)w(n)\exp\left(-j\frac{2\pi nk}{N}\right)$$

where, y(n) is the signal to be identified, n is time label, N is the frame length with a value of 512, w(n) is a Hamming window with a length of 512; l is a serial number of time frames, and k is a serial number of frequency bands. The example diagram of the Hamming window is shown in FIG. 2.

S2: Computing group delay characteristics by using the signal power spectrum and the modulation signal power spectrum, the particular method is as follows:

$$\tau(1, k) = \frac{\text{Re}(Y(1, k))\text{Re}(X(1, k)) + \text{Im}(Y(1, k))\text{Im}(X(1, k))}{|Y(1, k)|^2}$$

where, Re(•) and Im(•) represent the real and imaginary parts of an extracted complex number respectively.

S3: Computing the mean value of the group delay characteristics, and then using the mean value results for smoothing computation to obtain phase information of the current frame signal, the particular method is as follows:

$$\Lambda(l) = \frac{1}{K}\sum_{k=1}^{K}\tau(1, k)$$

$$\chi(l) = \alpha\chi(l-1) + (1-\alpha)\Lambda(l)$$

where:

τ(l,k): group delay characteristics;

Λ(l): mean value of the group delay characteristics;

K: number of the frequency bands, the value of which is 257;

χ(l): phase information of the current frame signal;

χ(l−1): phase information of the previous frame signal;

α: interframe smoothing factor, the value of which is 0.98.

S4: Computing the dynamic threshold by using the phase information of the current frame signal, the particular method is as follows:

$$\varepsilon(l) = \frac{1}{L}\sum_{m=1}^{L}\chi(l-m)$$

where,

ε(l): dynamic threshold;

L: window length used to compute the dynamic threshold, the value of the window length is 20;

χ(l−m): phase information of the previous m frame signals;

taking PJ10001.wav data as an example, the value of current frame phase information χ(l) at the 4th second equals 0.8, the dynamic threshold ε(l) equals 0.21;

deciding whether the signal is tampered by using the dynamic threshold and the phase information of the current frame signal, the particular method is as follows:

$$H(l) = \begin{cases} 1, \text{ if } |\varepsilon(l) - \chi(l)| > \gamma|\varepsilon(l)| \\ 0, \text{ otherwise} \end{cases}$$

where,

H(l): the identification result of each frame;
γ: the set threshold, the value of which is 2;
|ε(l)–χ(l)|: phase difference of the frame signal;
|ε(l)|: modulus of the dynamic threshold;

for the identification result of each frame, H(l), if the phase difference of the current frame signal exceeds the modulus of dynamic threshold by γ times, it means that there is a significant difference in the current frame signal and the identification result is 1, which indicates that the signal in this frame is tampered data; otherwise, the identification result is 0, which indicates that the signal in this frame is normal voice information.

The difference between the phase information of the current frame signal and the historical average value computed by the above method is 0.59, which exceeds twice the dynamic threshold. Therefore, it is identified as forged data, and the audio is successfully detected.

Taking the Equal Error Rate (EER) indicator as the overall evaluation indicator of the data set, compared with the two existing methods, labeled as LFCC-GMM and CQCC-GMM respectively, the average results of this invention are shown in the table below:

| EER(%) | LFCC-GMM(1) | CQCC-GMM(2) | The Present Invention |
| --- | --- | --- | --- |
| Dev-test set | 11.96 | 13.54 | 0.48 |
| Eva-test set | 9.81 | 11.04 | 0.72 |

The terms used in this present invention are intended solely to describe particular embodiments and are not intended to limit the invention. The singular forms "one", "the" and "this" used in the present invention and the appended claims are also intended to include the plural forms, unless the context clearly indicates otherwise. It should also be understood that the terms "and/or" used herein refer to and include any or all possible combinations of one or more associated listed items.

It should be understood that although the terms first, second, third, etc. may be used to describe information in the present invention, such information should not be limited to those terms. Those terms are only used to distinguish the same type of information from one another. For example, without departing from the scope of the present invention, the first information may also be referred to as the second information, and similarly vice versa. Depending on the context, the word "if" as used herein can be interpreted as "while" or "when" or "in response to certainty".

Embodiments of the disclosed subject matter and functional operations described in this specification may be implemented in digital electronic circuits, tangible computer software or firmware, computer hardware including the structures disclosed in this specification and their structural equivalents, or a combination of one or more of them. Embodiments of the subject matter described herein may be implemented as one or more computer programs, that is, one or more modules of computer program instructions encoded on a tangible non-transitory program carrier to be executed by the data processing apparatus or to control the operation of the data processing apparatus. Alternatively or additionally, program instructions may be encoded on manually generated propagation signals, such as electrical, optical or electromagnetic signals generated by machine, which are generated to encode and transmit information to a suitable receiver for execution by the data processing apparatus. The computer storage medium may be a machine-readable storage device, a machine-readable storage substrate, a random or serial access memory device, or a combination of one or more of them.

The processing and logic flow described in this specification can be executed by one or more programmable computers executing one or more computer programs to perform corresponding functions by operating according to input data and generating output. The processing and logic flow can also be executed by an application specific logic circuit, such as FPGA (field programmable gate array) or ASIC (application specific integrated circuit), and the apparatus can also be implemented as an application specific logic circuit.

Computers suitable for executing computer programs include, for example, general-purpose and/or special-purpose microprocessors, or any other type of central processing unit. Generally, the central processing unit receives instructions and data from read-only memory and/or random access memory. The basic components of a computer include a central processing unit for implementing or executing instructions and one or more memory devices for storing instructions and data. Generally, the computer further includes one or more mass storage devices for storing data, such as magnetic disk, magneto-optical disk or optical disk, or the computer is operatively coupled with the mass storage device to receive data from or transmit data to it, or both. However, this device is not a necessity for a computer. Additionally, a computer may be embedded in another device, such as a mobile phone, a personal digital assistant (PDA), a mobile audio or video player, a game console, a global positioning system (GPS) receiver, or a portable storage device such as a universal serial bus (USB) flash drive, just to name a few.

Computer readable media suitable for storing computer program instructions and data include all forms of nonvolatile memory, media and memory devices, such as semiconductor memory devices (such as EPROM, EEPROM and flash memory devices), magnetic disks (such as internal hard disks or removable disks), magneto-optical disks, and CD-ROM and DVD-ROM disks. The processor and memory may be supplemented by or incorporated into a dedicated logic circuit.

Although this specification contains many embodiments, these should not be construed to limit the scope of any invention or the scope of protection claimed, but are intended primarily to describe the characteristics of specific embodiments of a particular invention. Some of the features described in multiple embodiments in this specification may also be implemented in combination in a single embodiment. On the other hand, features described in a single embodiment may also be implemented separately in multiple embodiments or in any suitable subcombination. In addition, although features may function in certain combinations as described above and even initially claimed as such, one or more features from the claimed combination may in some cases be removed from the combination, and the claimed combination can be directed to a sub-combination or a variant of the sub-combination.

Similarly, although operations are described in a particular order in the drawings, this should not be construed as requiring these operations to be performed in the particular order or sequence as shown, or requiring all illustrated operations to be performed to achieve the desired results. In some cases, multitasking and parallel processing may be advantageous. In addition, the separation of various system modules and components in the above embodiments should not be construed as requiring such separation in all embodiments, and it should be understood that the described program components and systems can generally be integrated together in a single software product or encapsulated into multiple software products.

Thus, specific embodiments of the subject matter have been described. Other embodiments are within the scope of the appended claims. In some cases, the actions described in the claims can be executed in different orders and still achieve the desired results. In addition, the processes described in the drawings do not have to be in the particular order or sequential order as shown to achieve the desired results. In some implementations, multitasking and parallel processing may be advantageous.

The description above are only the preferred embodiments of the present invention and are not intended to limit the present invention. Any modification, equivalent replacement, improvement, etc. made within the spirit and principle of the present invention shall be included in the scope of protection of the invention.

What is claimed is:

1. A digital audio tampering forensics method based on phase offset detection, comprising:
   S1: multiplying a signal to be identified with a time label to obtain a modulation signal of the signal to be identified;
   then performing a short-time Fourier transform on the signal to be identified and the modulation signal to obtain a signal power spectrum and a modulation signal power spectrum; wherein the short-time Fourier transform on the signal to be identified and the modulation signal is performed according to the following formulas:

$$Y(1, k) = \sum y(n)w(n)\exp\left(-j\frac{2\pi nk}{N}\right)$$

$$X(1, k) = \sum ny(n)w(n)\exp\left(-j\frac{2\pi nk}{N}\right)$$

wherein, y(n) is the signal to be identified, n is a time label, N is a frame length with a value of 512, w(n) is a Hamming window, 1 is a serial number of time frames, and k is a serial number of frequency bands;
   S2: computing group delay characteristics by using the signal power spectrum and the modulation signal power spectrum; wherein computing the group delay characteristics by using the signal power spectrum and the modulation signal power is performed according to the following formula:

$$\tau(1, k) = \frac{\text{Re}(Y(1, k))\text{Re}(X(1, k)) + \text{Im}(Y(1, k))\text{Im}(X(1, k))}{|Y(1, k)|^2}$$

wherein, Re(•) and Im(•) represent the real and imaginary parts of an extracted complex number respectively;

S3: computing a mean value of the group delay characteristics, and then using the mean value results for smoothing computation to obtain phase information of a current frame signal; wherein computing the mean value of the group delay characteristics, and then using the mean value results for smoothing computation is performed according to the following formulas:

$$\Lambda(l) = \frac{1}{K}\sum_{k=1}^{K}\tau(1, k)$$

$$\chi(l) = \alpha\chi(l-1) + (1-\alpha)\Lambda(l)$$

wherein:
   $\tau(1,k)$: group delay characteristics;
   $\Lambda(l)$: mean value of the group delay characteristics;
   K: number of the frequency bands;
   $\chi(l)$: phase information of the current frame signal;
   $\chi(l-1)$: phase information of the previous frame signal;
   $\alpha$: interframe smoothing factor; and
S4: computing a dynamic threshold by using the phase information of the current frame signal, and then deciding whether the signal is tampered by using the dynamic threshold and the phase information of the current frame signal.

2. The digital audio tampering forensics method based on phase offset detection according to claim 1, wherein the number of the frequency bands is 256.

3. The digital audio tampering forensics method based on phase offset detection according to claim 2, wherein the value range of the interframe smoothing factor is 0.9-0.98.

4. The digital audio tampering forensics method based on phase offset detection according to claim 1, wherein computing the dynamic threshold by using the phase information of the current frame signal is performed according to the following formula:

$$\varepsilon(l) = \frac{1}{L}\sum_{m=1}^{L}\chi(l-m)$$

wherein,
   $\varepsilon(l)$: dynamic threshold;
   L: window length; and
   $\chi(l-m)$: phase information of the previous m frame signals.

5. The digital audio tampering forensics method based on phase offset detection according to claim 4, wherein the value range of the window length L used in computing the dynamic threshold is 20-30.

6. The digital audio tampering forensics method based on phase offset detection according to claim 1, wherein deciding whether the signal is tampered is performed according to the following formula:

$$H(l) = \begin{cases} 1, & \text{if } |\varepsilon(l) - \chi(l)| > \gamma|\varepsilon(l)| \\ 0, & \text{otherwise} \end{cases}$$

wherein,
   $H(l)$: the identification result of each frame;
   $\gamma$: the set threshold;
   $|\varepsilon(l) - \chi(l)|$: phase difference of the frame signal; and
   $|\varepsilon(l)|$: modulus of the dynamic threshold;

for the identification result of each frame, $H(l)$, if the phase difference $|\varepsilon(l)-\chi(l)|$ of the current frame signal exceeds the modulus $|\varepsilon(l)|$ of the dynamic threshold by $\gamma$ times, it means that there is a significant difference in the current frame signal and the identification result is 1, which indicates that the signal in this frame is tampered data; otherwise, the identification result is 0, which indicates that the signal in this frame is normal voice information.

7. The digital audio tampering forensics method based on phase offset detection according to claim 6, wherein the value range of the set threshold $\gamma$ is 1.5-2.

* * * * *